INVENTORS: J. S. MAYO
R. J. TRANTHAM
BY Harry C. Hart
ATTORNEY

INVENTORS: J. S. MAYO
R. J. TRANTHAM
BY Harry C. Hart
ATTORNEY

INVENTORS: J. S. MAYO
R. J. TRANTHAM
BY Harry C. Hart
ATTORNEY

United States Patent Office 3,175,157

Patented Mar. 23, 1965

3,175,157

STATISTICAL FRAMING OF CODE WORDS IN A PULSE CODE RECEIVER

John S. Mayo, Berkeley Heights, and Robert J. Trantham, Chatham, N.J., assignors to Bell Telephone Laboratories, Incorporated, New York, N.Y., a corporation of New York Filed July 24, 1961, Ser. No. 126,285
14 Claims. (Cl. 325—321)

This invention relates to the framing of pulse code signals and more particularly to the statistical framing of such signals.

In pulse code systems a message wave is converted at a transmitter into groups of sequential pulse signals. Each group constitutes a code word whose number of signals depends upon the code being employed. Once encoding has taken place, recovery of the information contained in the message wave requires that the pulse signals be correctly grouped, i.e., correctly "framed," at a receiver. Conventionally this has been accomplished by accompanying the code words with framing signals. Unfortunately, framing signals cause a consequent reduction in transmission capacity that becomes increasingly significant with codes having a small number of signals per word. Accordingly, it is an object of the invention to accomplish the framing of pulse code signals without apppreciably reducing channel capacity. A concurrent object is to eliminate the need for framing signals.

When received code signals are misgrouped, the properties of a message wave reconstituted from the signals may differ appreciably from the properties of the message wave as originally transmitted. Hence, a detected divergence between the anticipated and actual properties of a reconstituted wave could indicate an out-of-frame condition of a receiver. In that event, an in-frame condition could be achieved by reframing a receiver decoder until the actual and anticipated properties are rendered substantially identical. On the other hand, the divergence may arise from an occasional error in transmission or decoding that is unrelated to an out-of-frame condition, and an ensuing reframing of the decoder would be premature. Nevertheless, with statistical properties of the waves, i.e., those based on a relatively large number of occurrences, certain of the properties are largely unaffected by occasional decoder and transmission errors. Accordingly, it is a further object of the invention to frame a decoder by reference to selected statistical properties of an incoming message wave. An associated object is to impart prescribed constraints to a message wave at its point of origin.

Once selected, a particular set of statistics may prove inadequate for maintaining the in-frame condition of a decoder. This can occur because of operating changes that alter the statistics of an incoming wave. Consequently, another object of the invention is to adapt statistical framing in accordance with operating changes. An associated object is to render the framing substantially independent of operating changes, while a still further object is to provide alternative ways of maintaining the in-frame condition.

In keeping with one aspect of the invention, the foregoing and related objects are accomplished by selecting, as the statistical property to be monitored, the probability distribution $P_k$ of a parmeter $k$ of a message wave being transmitted. When the parameter $k$ assumes discrete values, the probability distribution $P_k$ is defined by the individual probabilities of the parameter on the aggregate of its possible values. See, for example, W. Feller, "An Introduction to Probability Theory and Its Applications," John Wiley, New York, 1950. A counterpart of probability distribution exists when the parameter $k$ ranges over a continuum of values, as demonstrated in J. V. Uspensky, "Introduction to Mathematical Probability," McGraw-Hill, New York, 1937.

At a receiver a measure of the distribution is obtained and compared with the measure that obtains for the in-frame condition. Upon detection of a disparity between the measures, incoming pulse signals are regrouped until the disparity is substantially reduced.

As prescribed by the invention, the parameter $k$ is selected from among various attributes of a message wave, such as frequency and power. When the parameter $k$ is the wave amplitude represented by a group of code signals, constituting a code level, the out-of-frame probability distribution $P'_k$ is discrete and contains $2^n$ terms, where $n$ is the number of digits in each code word The distribution of code levels $P'_k$, regardless of the number $m$ of code positions by which the code signals are misgrouped, is given by the following relation:

$$P'_k=\left[\sum_{x=0}^{x=2^m-1} P_{(x\cdot 2^{n-m}+r)}\right]\left[\sum_{y=0}^{y=2^{n-m}-1} P_{(s\cdot 2^{n-m}+y)}\right] \quad (1)$$

where $r=0, 1, \ldots, 2^{n-m}-1$ $s=0, 1, \ldots, 2^m-1$ and $k=r\cdot 2^m+s.$

Equation 1 is derived by considering a group of $n$ digits that have been misgrouped by an arbitrary amount $m$. Each resulting error word of code level $k$, where $k$ varies from 0 to $2^n-1$, has a probability that is contributed by the two source words that would encompass the constituent pulse signals of the error word were it not for the misgrouping. For each source word the probability contributed to an error word is the sum of the individual probabilities of the various code levels from which the source word is derivable. Consequently, the probability of the error word is the joint probability given by the product of the sums of the source probabilities. For example, with a conventional code of three binary digits, or "bits" ($n=3$), there are $2^3$ or eight possible words, with levels ranging from zero to seven. The sixth word ($k=6$) is given by the sequence 110. If it has been formed through misgrouping by one code postition ($m=1$), its digits are derived from two successive code words. The first two digits are obtainable from a code word of either level three of level seven, with a probability $P_3$ or $P_7$. The third digit is derivable from a code word commencing with a "zero," namely one whose level ranges from zero through three, and whose probability ranges from $P_0$ through $P_3$. Therefore, the probability $P'_6$ of the error code word is given by $(P_3+P_7)$ $(P_0+P_1+P_2+P_3)$. When this procedure is generalized, Equation 1 is obtained.

From a measure of the various distributions, an out-of-frame condition is determined. Such a measure is given by the variance or second moment of the disrtbution, which is, in turn, indicated by root-mean-square reading. Other moments and measures of the distribution may be employed and, upon detection of a disparity between the anticipated and detected measures, the incoming pulse signals are regrouped until the disparity is substantially reduced.

It is a feature of the invention that changes in the in-frame distribution are monitored and may be used to adjust the reference measure that is compared with the indicated measure of the distribution. When a root-mean-square indicator is employed, the reference measure is adjusted according to changes in a peak reading of the distribution. Thus, as the characteristics of the transmitted wave are altered, the response of a monitor unit is altered in a like manner.

In keeping with the invention, constraints are imposed upon certain of the probability distributions. This can be done by adding a fixed frequency tone of limited amplitude to the wave, in which case an out-of-frame condition is indicated when the tonal amplitude increases appreciably beyond a prescribed limit.

Similarly, a bound can be imposed by confining the probability distribution of wave energy to a restricted portion of the frequency spectrum. The detection of signal energy beyond the restricted region serves to indicate an out-of-frame condition.

A related bound imposed by the invention is on the probability distribution of message signal first differences. For the out-of-frame condition, the detected amplitude difference between successive pulse signals experiences a substantial increase in amplitude and is used to reframe the decoder.

Other features of the invention will become apparent after the consideration of an illustrative embodiment, taken in conjunction with the drawings in which.

Figures 1, 4:
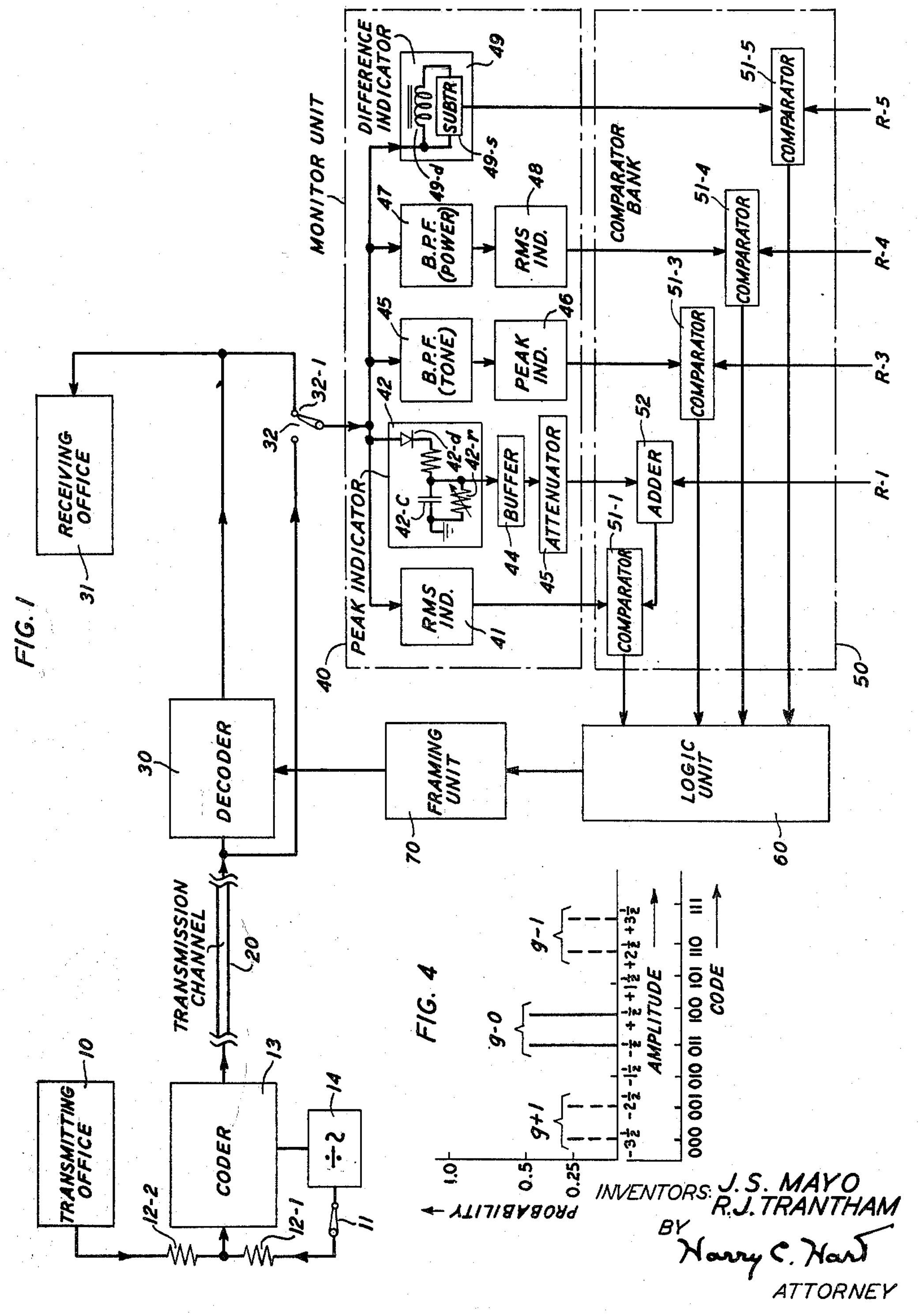
FIG. 1 is a block diagram of a frequency-division multiplex system according to the invention.
FIG. 4 is a probability distribution graph for a tone signal applied to the system of FIG. 1.

Turn now to the frequency-division multiplex system of FIG. 1. At a transmitting office 10 a master group of channels is formed in a frequency-division multiplexer of the kind shown in FIG. 5.8 of "Transmission Systems," Bell Telephone Laboratories, New York, 1958. Typically, the master group includes six hundred voice channels, each with a 4 kilocycle bandwidth. With upper side band modulation, when no guard spaces are provided between bands, the carrier frequencies of the voice channels range from 200 kilocycles to 2.6 megacycles.

In keeping with one aspect of the invention, it is desirable to include a fixed-frequency tone with the multiplexed message. For that situation a tone switch 11 is set in its closed position and a composite wave, derived by way of respective summing resistors 12–1 and 12–2, enters a coder 13 having a small magnitude input impedance. Within the coder 13 the composite wave is sampled periodically, and each sample is converted into a sequence of pulse signals, whose number and disposition depend upon the code being employed. Ordinarily the groups of code signals derived from the samples would be accompanied by marker signals to frame a decoder and thus preserve the identities of the groups.

The invention, however, contemplates framing based upon the statistical properties of the wave being transmitted, and marker signals are omitted at the coder 13.

Since the highest frequency in the master group is 2.604 megacycles, resulting from the upper sideband modulation of the 2.6 megacycle carrier with a 4 kilocycle information wave, the sampling frequency is chosen in excess of twice that figure. For convenience the coder 13 samples near a 6 megacycle rate and produces approximately nine bits per sample, giving an output bit rate in the vicinity of 54 megacycles.

The frequency of the tone should not exceed half the sampling rate to facilitate its recovery at a decorder. If the frequency of the tone is made exactly one half the sampling rate, it must be phase-locked with the coder 13 to forestall the possibility of its being sampled where it has zero amplitude. As shown in FIG. 1, the tone is derived directly from the coder 13 through a divideby-two unit 14. Regardless of its origin, the tone should occupy a position of the frequency spectrum where the energy of the multiplexed message wave is minimal. In the spectrum contemplated, that position lies in the range from 2.604 to 3 megacycles. As for its amplitude, the tone is desirably a small percentage, advantageously one percent, of the full scale amplitude handled by the coder 13. With a nine bit code such a tone would occupy but five levels out of the total of five-hundred-twelve levels available.

From the coder 13 the encoded composite wave is conveyed by a transmission channel 20 of appropriate bandwidth to a decoder 30, whose output is demultiplexed at a receiving office 31 akin to the transmitting office 10. The decoder 30 is accompanied by a monitor unit 40 that accommodates either digital or analog data, depending upon the setting of a monitor switch 32. As shown, the switch is set in its secondary position 32–1 and the various paths of the monitor unit 40 receive the composite wave after being decoded.

The first path of the monitor unit 40 includes an indicator 41 that monitors the amplitude probability distribution of the decoded message. An appropriate indicator for this purpose is an instrument that gives root-mean-square reading.

To detect variations in the distribution a peak indicator 42 is included in the second path. An appropriate indicator is constituted of a rectifying diode **42–*d* that is resistively coupled to a discharge circuit having a controlled time constant. In the discharge circuit a storage device, such as a capacitor 42–*c*, is shunted by a variable resistor 42–*r* that allows the charge accumulated by the capacitor 42–*c* to decay at a prescribed rate. Further constituents of the second path are a variable attenuator 43 and a buffer 44, the latter isolating the peak indicator 42 from the attenuator 43**.

The third path of the monitor unit 40 contains a narrow band filter 45 centered about three megacycles to enable capture of any tone included with the multiplexed wave at the transmitter. The magnitude of the tone is given by a peak indicator 46.

In the fourth path a narrow band filter 47, followed by a root-mean-square indicator 48, monitors the energy of the decoded signal falling into a spectral interval from which message constituents are excluded when the decoder 30 is in frame.

The final path of the monitor unit 40 encompasses a difference indicator 49, which monitors the derivative of the decoded message wave. This is done by a subtractor **49–*s*, whose inputs are the decoded samples and their counterparts, as delayed by the intersample interval in a delay line 49–*d***.

Beyond the monitor unit 40 the various indicator paths enter a composite bank 50 of comparators 51, whose individual components may include differential amplifiers. Each component comparator is supplied with a reference signal, having a magnitude that is established with regard to restrictions to be discussed subsequently. Once input comparisons are made, the comparator bank 50 provides a logic unit 60 with signals that, individually or collectively, activate a framing unit 70. When individual activation is desired from all comparators 51 of the comparator bank 50, the logic unit 60 takes the form of an OR gate.

Upon being received at the decoder 30, pulse signals are appropriately grouped by the framing unit 70. As long as an input to at least one of the comparator components 51 exceeds a simultaneously applied reference signal R, the framing unit 70 causes the decoder pulse signals to be regrouped by one digit position during successive time intervals. Constituents adaptable to the framing unit are shown in Patent 2,949,503 of F. T. Andrews, Jr., et al.

Figure 2A:
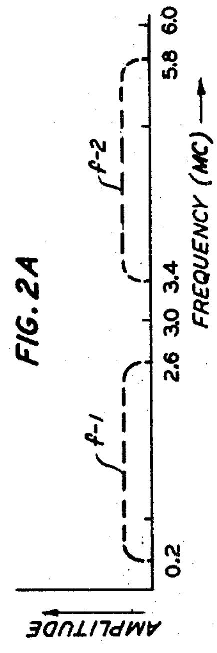
FIGS. 2A and 2B are respective graphs of a portion of the frequency spectrum and of various probability distributions associated with the system of FIG. 1.
Figure 2B:
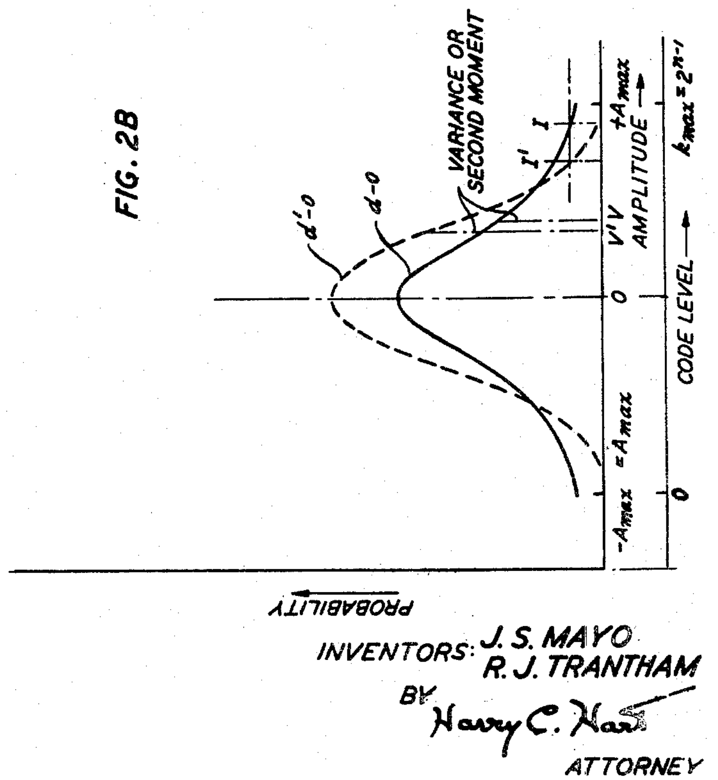

To understand the statistical framing of the multiplex system in FIG. 1, consider the spectral and amplitude distributions shown in the graphs of FIGS. 2A and 2B. As indicated by the left-hand envelope $f$–1 in FIG. 2A, the frequency spectrum before sampling extends from about 0.2 to 2.6 megacycles. It is to be understood that the actual spectrum is composed of a sequence of spectral bands accompanying the several carrier frequencies. After sampling, additional envelopes appear about harmonics of the sampling frequency. Thus, the first harmonic of the sampling frequency, namely 6 megacycles, has a lower envelope $f$–2 that extends approximately from 3.4 to 5.8 megacyles. Consequently, there is a region between 2.6 and 3.4 megacycles where the only frequency component in appearance is that of the tone, which is at 3 megacycles.

For the spectral distribution of FIG. 2A the associated amplitude probability distribution depends upon the number of channels included in the master group formed at the transmitting office 10 in FIG. 1. When the number of channels is as large as 600, the signal variations in one channel appear to occur randomly with respect to the signal variations in the other channels. Hence, the overall amplitude probability distribution resembles that associated with the fluctuations of noise signals. The resulting distribution, neglecting the small amplitude tone, is indicated by the solid-line curve $d$—0 in FIG. 2B and is called Gaussian. It is symmetrical with respect to the peak point $p$ at its most probable amplitude. From the peak point $p$ the distribution tapers in both the positive and negative directions on the amplitude scale, to a theoretical probability of zero for large amplitudes. Because the equipment of a practical multiplexing system is amplitude limited, the distribution is instead truncated at its upper and lower extremities. Typically, the coder is designed to have an input gain such that the truncation amplitude $A_{max}$ is exceeded about one percent of the operating time.

Since the various amplitudes are coded by the system of FIG. 1, the distribution curve $d$—0 of FIG. 2B is accompanied by a second abscissal scale giving the discrete code levels associated with various amplitudes. For example, with a nine-bit code there are five-hundred-twelve code levels, and the scale extends from a level of zero at the left-hand extremity of the distribution to the level of five-hundred-eleven at its right-hand extremity. It is to be understood that the code levels are discrete and that the solid-line curve $d$—0 merely forms an envelope.

As the number of active channels is reduced the distribution departs from Gaussian. The departure is slight until the number of channels falls below 64, after which the most probable ampltiude becomes increasingly probable and the upper and lower extremities of the distribution approach low order probabilities more rapidly. A limiting distribution that is applicable when the number of active channels is in the neighborhood of 16, a situation that is but occasionally encountered in practice, is given by the dashed-line curve $d'$—0 of FIG. 2B.

Assume that there are 600 active channels in the multiplex system of FIG. 1, then the Gaussian distribution $d$—0 of FIG. 2B applies. This distribution is present at the output of the coder 13 (FIG. 1) and it should likewise be present at the output of the decoder 30 provided that the decoder 30 is in-frame; that is to say, if the incoming pulse signals at the decoder 30 are correctly grouped. When the decoder 30 is out-of-frame, the probability distribution is no longer Gaussian. By the use of Equation 1, the resulting distribution can be obtained for each out-of-frame condition. With a nine-bit code it is apparent that there are eight such out-of-frame distributions. The resulting distributions $d$—1 and $d$—2 for code signals misgrouped by one code position and by two code positions are given in FIGS. 3A and 3B, respectively. The way in which the out-of-frame distributions are obtained from Equation 1 will be demonstrated subsequently for a three megacycle tone encoded according to a three-bit code.

Figure 3A:
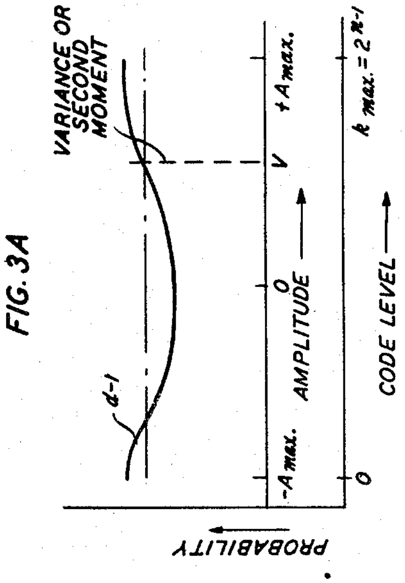
FIGS. 3A and 3B are selected probability distribution graphs for the system of FIG. 1 in its out-of-frame condition.
Figure 3B:
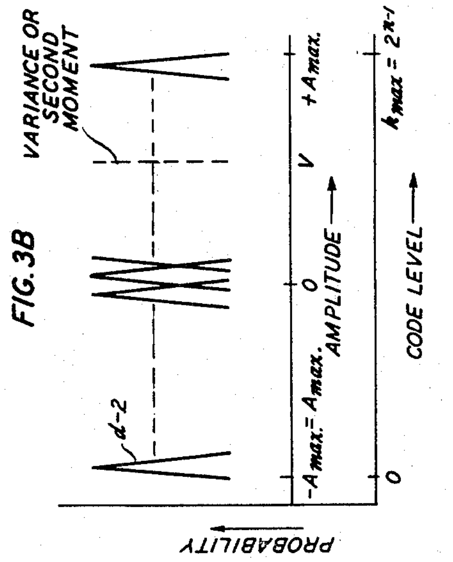

By measuring selected parameters of the various in-frame and out-of-frame distributions, the out-of-frame condition is readily detected. One such parameter is the variance of the distribution. The variance is given by a mean-square voltage reading when the amplitudes of the distribution are in terms of voltages. Because of the squaring involved in the calculation of the variance, it is often referred to as the second moment of the distribution, and is given by the moment of inertia of each planar figure in FIGS. 2A, 3A, and 3B. These second moments have been indicated by the variance positions V and V′ on the various distributions. For an out-of-frame distribution the second moment is considerably greater than for the in-frame Gaussian distribution. Consequently, when the root-mean-square indicator 41 in the monitor unit 40 of FIG. 1 gives a reading in excess of the square root of the lowest second moment for amount-of-frame probability, the framing unit 70 should be commanded to regroup the incoming code signals at the decoder 30. In FIG. 2B the second moment for the in-frame distribution $d$—0 is approximately four-tenths of the peak amplitude $A_{max}$. On the other hand, the second moments for associated out-of-frame distributions, as exemplified by distributions $d$—1 and $d$—2 of FIGS. 3A and 3B, are all very much alike, with a minimum magnitude of approximately five-tenths of the peak amplitude $A_{max}$ occurring for the distribution (not shown) where the incoming signals are misgrouped by eight code positions. This information can be used directly to detect an out-of-frame condition. For example, if the peak amplitude of the solid-line distribution $d$—0 in FIG. 2B is 10 volts, the r.m.s. indicator 41 will read 4 volts when the decoder 30 is in-frame, but it will read a minimum of 5 volts when the decoder 30 is out-of-frame. Thus a reference signal applied directly to the first comparator would be set at the mean of the two readings, namely at 4.5 volts. Of course, the magnitude of the reference signal would change as the peak amplitude $A_{max}$ changes. Usually the changes in peak amplitude are known. If they are not, they may be obtained by using a conventional peak detector.

However, instead of being applied directly to the first comparator, the r.m.s. reference signal $R_1$ in FIG. 1 energizes one terminal of an adder 52, whose other terminal is supplied by way of the peak indicator 42. This is to compensate the reference signal $R_1$ for reduced channel activity, typically when the number of active channels falls below 64. The discharge resistor 42–$r$ in the peak indicator 42 is so adjusted that the signal stored by the associated shunt capacitor 42–$c$ is a prescribed percentage of peak amplitude $A_{max}$ for the most probable distribution, namely the Gaussian distribution $d$—0. An appropriate probability level for the indicated amplitude I is given in FIG. 2B. As the number of active channels is reduced and the distribution changes, the indicated amplitude I′ will be given substantially by the intersection of the original probability level and the changed distribution $d'$—0. The reference input $R_1$ to the first comparator 51–1 should change accordingly. An accommodation that is satisfactory over a wide range is obtained by adjusting the attenuator 45. For limiting distributions $d$—0 and $d'$—0, i.e., those associated with maximum and minimum numbers of anticipated active channels, the reference signal R applied to the adder 52 of FIG. 1 plus an attenuated portion $a$ of the indicated amplitude I is made equal to the nominal reference signal R′ according to the following relation:

$$R+aI=R' \qquad (2)$$

Assume indicated amplitudes of 9 and 7 volts and nominal reference amplitudes of 4.5 and 4.0 volts for the respective limiting distributions $d$—0 and $d'$—0 of FIG. 2B. When Equation 2 is solved for $R=R_1$ and $a$, the respective values are found to be 2.25 and 0.25 respectively.

The foregoing arrangements are readily extended to higher order moments where there is an even greater divergence between the in-frame and out-of-frame measures. Of course, the first moment given by a running average of the wave is of use where the out-of-frame average departs from zero, as in the case of video signals.

Again, an out-of-frame indication may be derived from several individual indicators, as by taking the ratio of root-mean-square and average measures. Still other composite indicators employ cross-correlation and auto-correlation techniques.

On the other hand, an in-frame condition can be established by monitoring successive regroupings of incoming signals and selecting the grouping having a minimum variance.

The statistical framing considered thus far has not been concerned with the fixed frequency tone added at the transmitter in FIG. 1. In fact, because of its small magnitude the tone has a negligible effect on the probability distribution $d-0$ of FIG. 2B. Taken alone, the distribution $g-0$ for a tone sampled at its positive and negative peaks consists of two singularities, each with a probability of 0.5 as indicated in FIG. 4. The composite distribution (not shown) for the tone and the multiplexed message is obtained from the convolution of the respective distributions. When the tonal amplitude is small, that is, near zero, the resulting composite distribution remains essentially that of FIG. 2B, as augmented slightly at the points of singularity associated with the tone.

Nevertheless, the tone affects all distributions in a similar way and thus imposes a constraint that can be used to frame the decoder 30. By analogy with FIG. 3A it is to be expected that the probability singularities from the tone should influence a composite distribution near its extremities if the decoder 30 is out-of-frame by one code position. An approximation to this result is obtained by applying Equation 1 to the distribution of FIG. 4 alone.

Consider the case where the number $n$ of code signals is three and the tone has a peak amplitude of one-half. If the signals are misgrouped by one code position, then following the procedure of Equation 1, the probability $P'_k$ of any code is given by Equation 3:

$$P'_k=\left[\sum_{x=0}^{x=1}P_{(4x+r)}\right]\left[\sum_{y=0}^{y=3}P_{(4s+y)}\right] \quad (3)$$

where $k=2x+y$.

In Equation 3 values of $r$ range from 0 to 3, being given by $k/2$ for even values of $k$ and $$\frac{k-1}{2}$$

for odd values of $k$. Values of $s$ are 0 or 1, depending upon whether $k$ is even or odd. The resultant probability distribution $g-1$ for the tone alone has the anticipated increase in its second moment, as shown by the dashed-line singularities in FIG. 4. Consequently, when the decoder 30 is out-of-frame by one code position, the peak amplitude of the tone increases beyond one-half unit.

Although the dashed-line singularities of the distribution $g-1$ maximum out-of-frame tone varies between two and one-half and three and one-half units, this variation is attributable to the way in which the initial probability distribution $g-0$ of FIG. 4 was formed. That distribution indicates that an amplitude of either plus one-half or minus one-half has a fifty percent probability in each instant of time. In fact, however, once a given amplitude occurs, the succeeding amplitude is determined. As a result, the actual increase in peak amplitude is limited to two and one-half units. Upon detection this increase is used to indicate the out-of-frame condition.

Figure 5:
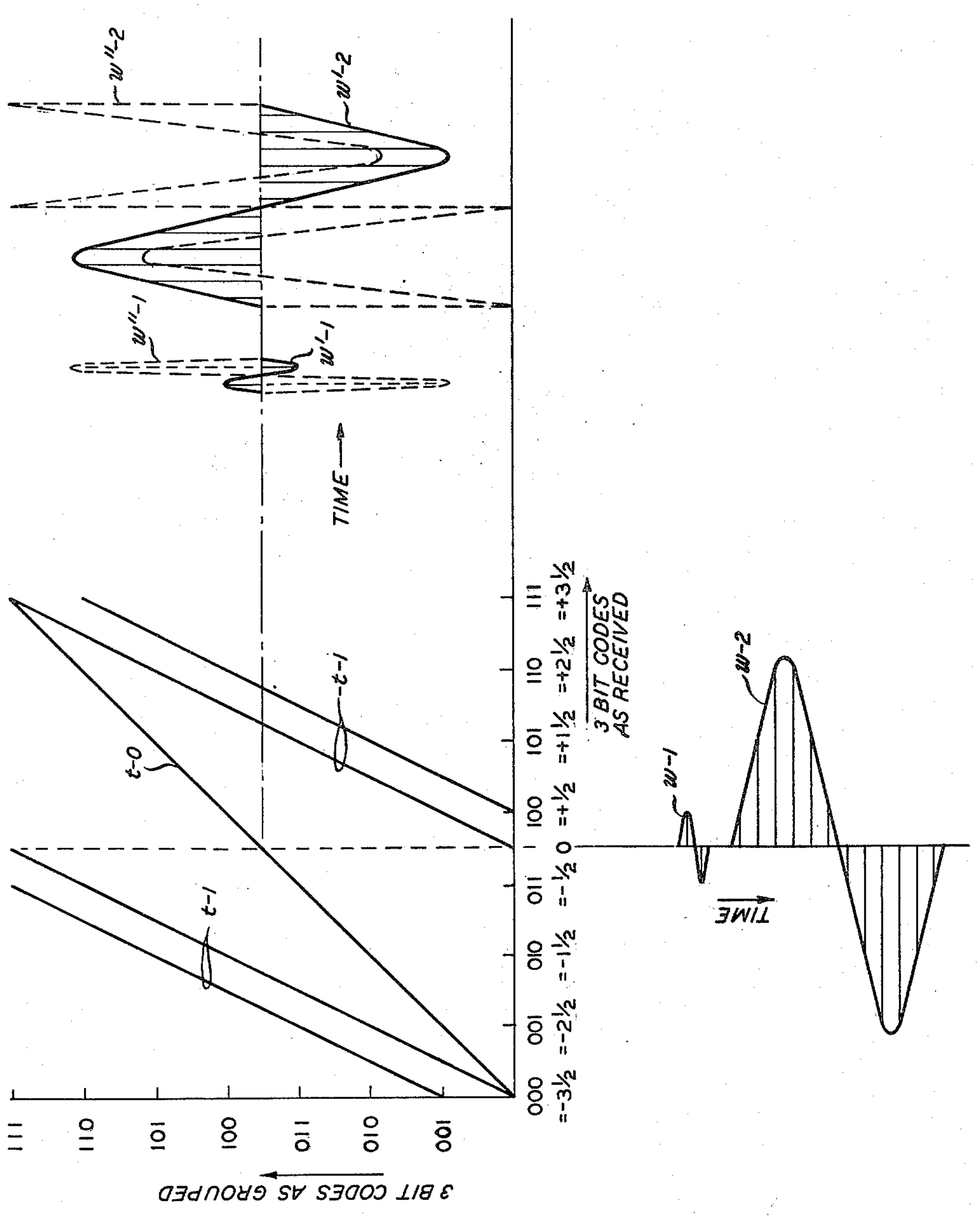
FIG. 5 is a diagram of transfer characteristics applicable to the system of FIG. 1.

Confirmation of the limited increase in tonal amplitude is obtainable from the transfer characteristics $t$ of FIG. 5. The abscissal axis of FIG. 5 is subdivided in terms of the various codes received at the decoder. For the purpose of comparison, the codes and their amplitudes correspond to those of FIG. 4. As the code signals are grouped at the decoder 30 they produce the codes designated on the axis of ordinates. If the decoder 30 is in-frame, the transfer characteristic $t$–0 is a straight line. If the decoder 30 is out-of-frame by one code position, the transfer characteristic $t$–1 has a dual range with a discontinuity at its zero amplitude level. The dual range occurs because there is an uncertainty during misgrouping as to whether the third digit will be a 0 or 1. The upper curves of the characteristic $t$–1 apply when the third digit is a 1 and the lower curves apply when the third digit is a 0. As the number of bits per code word becomes large, the out-of-frame characteristic $t$–1 is substantially described by the inner curves of FIG. 5.

As with FIG. 4, assume that the fixed frequency tonal signal arriving at the decoder ranges in amplitude between plus one-half unit and minus one-half unit. Such a signal is represented by the first waveform $w$–1 in the lowersubgraph of FIG. 5. Since the sampling rate is 6 megacycles for the system of FIG. 1, the tone is represented by two samples per cycle. When the pulse signals representing these samples are correctly grouped, they produce two counterpart samples of the first waveform $w'$–1 in the right-hand subgraph of FIG. 5. However, if the digits corresponding to the samples are incorrectly grouped by one code position, the error code words result in two samples per cycle represented by dashed-line markers of the waveform $w''$–1 in the right-hand subgraph. Although the use of a framing characteristic has a dual range, only the inner curves are applicable as can be seen by writing successive code words for the tone and misgrouping their digits by one code position.

If the tone does not vary about a zero level, as shown in FIG. 5, but is instead biased to some other code level, the amplitude accompanying the misgrouped signals of the tone will not be as great as indicated, but in any event, it will be at least doubled.

It is to be noted that the result achieved for the tonal signal is a special one attributable to the fact that the signal is phase-locked with the sampling oscillator. With lower frequency signals the number of samples per cycle is considerably greater than two, as illustrated by the second waveform $w$–2 in the lower subgraph of FIG. 5. The translated counterparts of the samples, when their code signals are correctly grouped and when they are misgrouped by one digit position are given by respective waveforms $w'$–2 and $w''$–2 in the right-hand subgraph of FIG. 5. The waveform $w''$–2 of the misgrouped counterpart is rich in harmonics, some of which may be in the vicinity of the frequency of the tone signal. However, if the band-pass filter 45 in the third path of the monitor unit 40 of FIG. 1 is made sufficiently selective, the harmonics will be substantially excluded and, if the reference signal $R_3$ applied to the comparator components 51–3 in FIG. 1 has a magnitude that is approximately double the magnitude given by the peak indicator 46, an out-of-frame condition can be detected using the tone alone. Thus, by imposing constraints on the probability distribution of the message wave, detected variations in those constraints can be used to frame a decoder.

Another probability constraint is associated with the frequency spectrum of the message wave. From FIG. 2A it is seen that there is little likelihood of having any energy in the spectral band extending from 2.6 to 3 megacycles, that is to say, the probability distribution for the message wave is bounded at 2.6 megacycles. But from FIG. 5 it is evident that an out-of-frame condition causes a discontinuity in the transfer characteristic $t$–1. As a result, multiple harmonics are produced for incoming signals whose frequencies are lower than one-half of the sampling frequency. Some of these harmonics will lie in the precluded region of the spectrum when the decoder 30 is out-of-frame. They are detected by a band-pass filter 47 included in the fourth path of the monitor unit 40 in FIG. 2 and the reference signal $R_4$ applied to the comparator component 51–4 is made slightly greater than zero to indicate the out-of-frame condition.

A further probability constraint attends the fact that a coder is usually limited in its ability to respond to changes in signal level. Hence, the difference between two successive samples is likewise limited and, as illustrated by FIG. 5, the difference monitored in the fifth path of the monitor unit 40 in FIG. 1 by the parallel combination of a subtractor 49–*s* and a delay line 49–*d* will be at least double as compared with the nominal reference level $R_5$ applied to the comparator 51–5. The ensuing signal obtained from the comparator 51–5 initiates reframing in the fashion described previously.

Other indicators will be apparent to those skilled in the art. Like the indicators previously discussed, they can be used individually or in combination. Also evident will be numerous adaptations of statistical framing to pulse code systems in general.

What is claimed is:

1. Apparatus for grouping a train of code signals into constituent code words, which code signals are derived from a message wave characterized by a probability distribution of known measures, comprising means for grouping the code signals into provisional code words, means for indicating a first measure of a probability distribution of a provisional message wave constituted of said provisional code words, means for detecting any departure of the indicated measure from said known measure, whereby a substantial disparity between the two measures indicates an erroneous grouping of said code signals, and means activated by said detecting means for regrouping said code signals to reduce said disparity.

2. Apparatus as defined in claim 1 wherein said indicating means comprises means indicating a moment of the probability distribution of said provisional message wave.

3. Apparatus as defined in claim 2 wherein said moment indicating means comprises means indicating a second moment of the probability distribution of said provisional message wave.

4. Apparatus as defined in claim 3 wherein said second moment indicating means comprises means indicating a root-mean-square measure of the probability distribution of said provisional message wave.

5. Apparatus as defined in claim 1 wherein said indicating means comprises means for measuring the probability distribution given by the following relation:

$$P'_k=\left[\sum_{x=0}^{x=2^m-1} P_{(x\cdot 2^{n-m}+r)}\right]\left[\sum_{y=0}^{y=2^{n-m}-1} P_{(s\cdot 2^{n-m}+y)}\right]$$

where $n$ is the number of digits in each code word, $m$ is the number of code positions by which the code signals are misgrouped and $k$ is a parameter selected from among various attributes of a message wave, including wave amplitude, equal to $r\cdot 2^m+s$, for which $r=0, 1, \ldots, 2^{n-m}-1$ and $s=0, 1, \ldots, 2^m-1$.

6. Apparatus as defined in claim 1 further including means for indicating a second measure of the probability distribution of said provisional message wave and means for adjusting said comparing means by said second measure indicating means, thereby to correctly regroup said code signals for each detected disparity despite an alteration in the probability distribution of said message wave.

7. Apparatus as defined in claim 1 wherein said indicating means comprises means for detecting a departure from a constraint of said known probability distribution.

8. Apparatus as defined in claim 7 wherein said departure detecting means comprises a band-pass means.

9. Apparatus as defined in claim 8 wherein said band-pass means comprises means for detecting only a fixed frequency tone.

10. Apparatus as defined in claim 8 wherein said band-pass means comprises means for indicating the presence of energy in an extended frequency interval of said band-pass means.

11. Apparatus as defined in claim 7 wherein said departure detecting means comprises means for indicating the difference in the magnitudes corresponding to two successive code groups of said wave.

12. Apparatus for processing code signals derived from a wave characterized by a probability distribution of known measure, comprising
- means for grouping the code signals,
- means for analyzing the grouped signals to detect any departure from said known measure,
- and means responsive to the analyzing means for regrouping said code signals upon detection of said departure.

13. Apparatus for grouping a train of code signals into constituent code words, which code signals are derived from a message wave characterized by a known probability distribution defined by the individual probabilities of a parameter on the aggregate of its possible values, includes a continuum of such values, comprising
- means for group the code signals into provisional code words,
- means for indicating a first measure of a probability distribution of a provisional message wave constituted of said provisional code words,
- means for providing a measure of said known probability distribution,
- means for comparing the indicated measure with the provided measure,
- whereby a substantial disparity between the two measures indicates an erroneous grouping of said code signals,
- and means activated by said comparing means for regrouping said code signals to reduce said disparity.

14. Apparatus for processing code signals, comprising an input point to which the signals are applied,
- means connected to said input point for decoding said signals,
- means responsive to the decoding means for indicating a measure of the probability distribution of the decoded signals,
- a reference point to which an anticipated measure of said probability distribution is applied,
- and means interconnecting said reference point with said decoding means for detecting disparity between the indicated and anticipated measures.

References Cited by the Examiner

UNITED STATES PATENTS

| | | | |
|---|---|---|---|
| 2,512,038 | 6/50 | Potts | 325—11 |
| 2,596,199 | 5/52 | Bennett | 325—41 |

DAVID G. REDINBAUGH, *Primary Examiner.*